United States Patent Office 2,817,592
Patented Dec. 24, 1957

2,817,592
ARTIFICIAL TUBING

Leo J. Novak and Jack J. Bulloff, Dayton, Ohio, assignors to The Commonwealth Engineering Company of Ohio, Dayton, Ohio, a corporation of Ohio No Drawing. Application March 8, 1954
Serial No. 414,864

21 Claims. (Cl. 99—176)

This invention relates, in general, to flexible tubing. In particular, it relates to flexible tubing capable of being used as artificial sausage casing.

Artificial casings composed of cellulose hydrate regenerated from viscose or reconstituted from cellulose derivatives are known. The improvements which have been made in the methods of producing the cellulose casings have resulted in widespread use thereof. However, as is known, cellulose is not well-adapted to human consumption and, when the casing is allowed to remain with the meat a casing more adapted to human consumption than a cellulose casing is desirable.

Also, when the cellulose casings are used in the production of so-called skinless frankfurters or the like, manual stripping thereof from the product is required. This takes time and labor and necessarily adds to the final cost of production. Also, as it involves manual contact with the food, there is increased possibility for contamination and, moreover, when the skin is stripped off with the use of a knife, a certain amount, substantial in total, of the meat is lost.

One object of the present invention is to provide new, edible artificial casings for meat products which are more adapted to human consumption than cellulose casings.

Another object is to provide casings which may be removed very conveniently by simple washing with water, hot or cold, to leave a compact, skinless meat product.

These and other objects which will appear hereinafter are accomplished by providing new tubings or casings comprising dextran.

The dextrans are high molecular weight polysaccharides made up of anhydroglucopyranosidic units joined by molecular structural repeating alpha-1,6 and non-alpha-1,6 linkages, at least 50% of these linkages being, apparently, of the 1,6 type. Dextrans vary widely with respect to molecular weight and molecular structural repeating alpha-1,6 to non-alpha-1,6 linkages ratios, and may be readily water-soluble, difficultly water-soluble or substantially water-insoluble as initially obtained, but dispersible therein. They may be obtained in various ways, including bacterial conversion of 1,4 linkages of dextrins to 1,6 linkages of dextrans.

Most commonly, dextran is obtained by biosynthesis from sucrose. Thus, a culture of a suitable microorganism, such as those of the *Leuconostoc mesenteroides* or *L. dextranicum* types may be prepared and inoculated into a nutrient medium containing sucrose, appropriate inorganic salts and particular nitrogenous materials, the mass being incubated until the dextran is biosynthesized in maximum yield. Or the enzyme dextransucrase may be produced in a separate step, as by cultivation of the microorganism *L. mesenteroides* B–512 (Northern Regional Research Laboratory classification), filtered from the culture, and introduced into the sucrose-containing medium, the mass being held under controlled conditions until the dextran is synthesized. This last method is sometimes referred to as the "filtered enzyme" method in which the dextran is synthesized enzymically in the substantial absence of bacteria and cellular debris.

In either method, under the normal or conventional conditions, the dextran obtained initially has an extremely high molecular weight generally calculated to be in the millions. It can be isolated from the medium in which it is produced by the addition of a suitable precipitant such as a water-miscible aliphatic alcohol or ketone.

Depending principally on the microorganism (or enzyme thereof) used in the biosynthesis, the dextran as obtained initially, that is, the "native" dextran, may be readily water-soluble or difficultly to substantially insoluble in water but dispersible therein.

For example, readily water-soluble dextran is normally obtained when the microorganisms (or their enzymes) bearing the following NRRL classifications: *Leuconostoc mesenteroides* B–512, B–119, B–1146, and B–1190 are employed. Dextrans synthesized by the microorganisms (or their enzymes) *Leuconostoc mesenteroides* B–523, B–742, B–1120, B–1191, B–1196, B–1208, B–1216, B–1144 and B–1384; *Betabacterium vermiforme* B–1139 and *Streptobacterium dextranicum* B–1254 are either very difficultly soluble in water, i. e, require special tedious precautions, or are substantially water-insoluble but are dispersible therein.

The "native" dextran may be dissolved or dispersed in water to obtain a solution or dispersion of high viscosity which may be formed into a sausage casing. Or the "native" dextran may be hydrolyzed by means of acid, alkali or enzymically to lower molecular weight dextran products which may or may not be water-soluble.

As is known, when high molecular weight dextran is partially degraded by means of acid or alkali, the resulting dextran products or fragments have varying non-uniform molecular weights.

On the other hand, and as disclosed in the pending application of W. W. Carlson et al., when an aqueous medium containing the dextran is subjected to the action of an endo-dextranase elaborated by the cultivation of molds of the genus Aspergilli, particularly *Aspergillus wentii*, the enzyme attacks the 1,6 linkages of the dextran selectively to split the high molecular weight material into fragments of lower, substantially uniform molecular weight between the initial molecular weight and a lower limit of about 20,000.

These uniform dextran partial hydrolyzates obtained by subjecting the high molecular weight dextran to the endo-dextranase action may be preferred for the present use.

Low or relatively low molecular weight dextran suitable for use in the manufacture of the sausage casings may also be obtained by controlling the conditions under which the dextran is synthesized from sucrose by the "filtered enzyme" method, that is, in the absence or substantial absence of bacteria and cellular debris.

The casings thus obtained, particularly those formed from the water-dispersible dextrans, have sufficiently pronounced hydrodurability to withstand cooking, for instance in an atmosphere of water vapor, and at the same time can be readily removed from the meat product by washing, even by dipping, in boiling water.

Instead of using the dextran itself to form the casing, it may be converted to a suitable dextran derivative or substitution product, dissolved in water or other suitable solvent, extruded to form the casing, which is usually stretched as a step in its manufacture prior to drying, or after drying and with re-wetting, and then treated to reconstitute the dextran.

In such procedure, various film-forming derivatives of dextran may be used such as dextran esters, for example, dextran nitrate, dextran formate, dextran acetate, dextran butyrate, dextran xanthates and dextran ether-xanthates, dextran thiourethanes, dextran xantho-fatty acids, dextran ethers, the glycollic acid ethers of dextran and their salts, etc.

In a preferred embodiment of the invention, dextran nitrate is used in making the tubing or casing and subsequently denitrated after the tubing has been formed and, preferably, after stretching thereof if such stretching is performed in addition to the normal stretch incidental to formation of the tubing. The invention will be discussed more in detail in connection with the formation of the casings from dextran nitrate.

Dextran may be symbolized as $[C_6H_7O_2(OH)_3]_x$, and a single anhydroglucopyranosidic unit (AGU) thereof as $C_6H_7O_2(OH)_3$. Since the D. P. does not directly effect the functional reactivity of the dextran, the nitrates of the invention may be symbolized as $[C_6H_7]_2(OH)_{3-n}X_n$, $n$ being the D. S. (degree of substitution or average number of nitrate groups per AGU). The D. S. may vary and may be from less than 1.0, for example 0.5:1 to 3:1. A D. S. of 0.5:1 to 0.9:1 is low, a D. S. of 1:1 to 1:1.9 is medium, a D. S. of 2:1 to 3:1 is high.

The low and medium-substituted dextran nitrates are usually water-soluble when the starting dextran is soluble in water, whereas the highly nitrated products are generally water-insoluble whether the starting dextran is soluble in water or insoluble therein.

The dextran nitrates may be prepared in several ways. For example, they may be prepared by reacting the selected dextran, in solid, particulate condition or dissolved or dispersed in water, with concentrated nitric acid, with fuming nitric acid, or with a mixture of nitric acid and nitrogen peroxide.

An advantage of the dextran nitrates obtained by nitrating the dextran in aqueous solution or dispersion is their homogeneity, the D. S. being readily controllable in the homogenous solution or dispersion, with little chance of unwanted changes with variations in the degree of polymerization of the dextran. The ready controllability and uniformity of the D. S. and the fact that the dextrans may be soluble or substantially insoluble in water but dispersible therein, permits of predetermination and fixing of the solubility characteristics of the nitrates. For example, and in sharp contrast to cellulose nitrate, both water-soluble and water-insoluble dextran nitrates can be obtained as uniformly nitrated products. This in turn permits of ready control of the denitration carried out during manufacture of the casings.

In making the casings, the selected dextran nitrate is dissolved in a solvent therefor to obtain a viscous solution which is then extruded through a suitable tube-forming device into a coagulating medium in which it is set up in the desired tubular form. The tubing is then washed if necessary to remove coagulating medium, and then passed through a denitrating bath.

If the tubing is to be stretched longitudinally, transversely, or in both the longitudinal and transverse directions, the stretching may be performed on the washed casing, the latter may be again washed with or without first releasing the stretching tension, and then passed through the denitrating bath or otherwise subjected to the action of such bath.

A suitable plasticizer such as glycerol may be incorporated in the extrusion solution and the denitrated tubing, after washing, may be softened by treatment with the plasticizer. In addition to glycerol, suitable plasticizers include ethylene glycol, propylene glycol, polyethylene glycols and other comestible plasticizers.

The dextran nitrate solution may be formed into tubing by either dry or wet extrusion methods. Thus, when the dextran nitrate selected is soluble in water, viscous aqueous solutions thereof may be prepared and extruded into a heated, inert gaseous atmosphere such as heated air, to evaporate the water and coagulate the dextran nitrate in the tubing form. If the nitrate is insoluble in water, it may be dissolved in an organic solvent such as isopropanol or in a mixture of organic solvents, such as a mixture of alcohol and ether to obtain the viscous extrudable solution to be formed into the desired tubing by the wet shaping or extrusion method, that is, by extruding it through the appropriate shaping device into a coagulating bath.

Dextran nitrate differs from cellulose nitrate in that, whereas the latter is insoluble in water at all degrees of nitration, dextran nitrate may be soluble in water and shaped into tubing by simple evaporation of water. When a coagulating bath is used, the bath is selected depending on whether the nitrate is soluble or insoluble in water. When non-aqueous solutions are extruded, the bath may be plain water; when aqueous solutions are extruded the bath may be ethyl ether.

The solution of the nitrate may be at room temperature or at somewhat elevated temperature below the boiling point of the solvent. The temperature of the coagulating bath may be varied between 20° C. and 60° C.

A special conditioning agent which facilitates stretching, when used, is most conveniently incorporated in the coagulating bath, but may be applied to the tubing after the latter has been removed from the coagulating medium, as in a dry extrusion process or even in the wet shaping method. A conditioning agent is not required when the tubing is not subjected to stretching other than the normal tension applied to it in the process of drawing it through the coagulating medium but is desirable, if not essential, when additional stretch is to be given the tubing.

Increased stretch, that is a stretch in addition to the stretch incidental to the shaping and coagulating, may be imposed on the tubing during shaping thereof and incidental to its passage through the coagulating medium, or after it has been withdrawn from the coagulating medium, and in any case preferably before the denitration. The tubing may be stretched both longitudinally and transversely successively or simultaneously.

If the tubing is stretched incidental to its passage through the coagulating bath the pressure of the coagulating liquid in and outside of the tubing will maintain it in distended condition and facilitate transverse stretching, the longitudinal stretching being the result of advancing the tubing in the predetermined path under the required tension.

When the tubing is stretched after removal from the coagulating medium, the longitudinal stretching is also effected by continuously advancing the tubing in a predetermined path under tension applied to successive portions of the tubing to elongate the tubing to the desired extent.

Transverse stretching is also effected by maintaining a pressure differential between the inside and outside of a portion of the length of the travelling tubing and the pressure differential may be brought about by the use of vacuum outside the tubing and/or fluid pressure within the tubing, or by the use of a greater fluid pressure within the tubing as compared to the pressure on the outside thereof. Uniform transverse stretching can be accomplished by maintaining air or other gas, or a column of a non-solvent for the dextran nitrate within the tubing. It is also possible to effect the stretching by means of mechanical pressure.

As will be understood, the maximum longitudinal and transverse stretch which the tubing will accept will vary with the condition of the tubing and the thickness of the walls thereof at the time the stretch is applied. It will also be apparent that, at higher degrees of stretch, the longitudinal and transverse stretch are interdependent due to the tendency of the tubing to contract transversely as it is streached longitudinally, and vice versa. The tubing may be stretched 5% to 60% longitudinally of its initial length and transversely 100% to 5% on the initial size or diameter of the tubing.

Any suitable denitrating medium may be employed for completely or substantially completely reconstituting the dextran from the ester, provided that it does not contain any substantial proportion of a solvent for the dextran. For instance, a 5% alcohol solution of sodium hydrosulfide may be used if the dextran is readily water-soluble, and a 5% aqueous solution of the sodium hydrosulfide may be selected as the denitrating medium if the dextran is not readily water-soluble. In a preferred embodiment, however, the ester is denitrated by treatment with 5%–10% alcoholic sodium hydroxide or with a suspension of a hypophosphite such as sodium hypophosphite or of a dithionate such as sodium dithionate in alcohol.

The casings of the invention are used and handled in the same manner as is common for other types of casings in the meat packing industry. In the typical practice, the sausage or meat emulsion is charged to a stuffer and is extruded under pressure from a stuffing horn into the denitrated dextran casing. As each individual casing is loaded or stuffed, it is usually tied to the end of another previously stuffed denitrated dextran casing to produce a string of stuffed casings which is passed through a suitable linking machine, after which the linked products are festooned over supporting frames or racks on which they are maintained during certain of the latter processing operations.

The racks or frames of the linked meats may be stored temporarily and may then be transferred to the smoke house and smoked at elevated temperature, if smoked products are being produced. After the smoke curing, the products, while held on the frames, may be placed in cookers and cooked in an atmosphere of water vapor for swelling and plumbing. Or the products may be cooked in water at temperatures which do not dissolve the casing or cause separation thereof from the meat. After the cooking, the racks holding the meat products may be removed from the cooking zone and the products may be sprayed with cold water, drained and chilled.

It will be understood that certain kinds of sausage products are marketed in uncooked condition and that some or all of the smoking, cooking and washing operations mentioned above may be omitted. It will also be understood that, in certain instances, the casing is removed from the finished product before it is marketed, for example, when the final product is to be a "skinless" frankfurter.

As indicated hereinabove, the dextran, after denitration may be readily water-soluble or dispersible therein. Although the casings formed from initially readily soluble dextrans are sufficiently hydrodural to withstand cooking under normal conditions, it may be preferred to form the casing from a nitrated dextran which, after the denitration, is difficultly soluble in water or substantially insoluble therein, when the stuffed meat product is of the kind which is cooked preparatory to marketing it, and removal of the casing is not desired.

Either kind of casing may be removed from the product by simple treatment with water, as by subjecting the encased product to a boiling water dip for a short time such as five or ten seconds, or by passing the products, disposed on a travelling perforated tray or other perforated carrier, under a boiling water spray.

Where the dextran "skin" or casing is to be dissolved or sloughed off the meat product by means of boiling water, and the product is of the kind which is cooked during preparation for marketing thereof, the separate cooking step may be omitted and the boiling water treatment for removing the casing relied on to effect the cooking. In this instance, the smoking operation may be longer than usual.

If the denitrated dextran is readily water-soluble, it will be dissolved off the product by the boiling water. If it is less readily soluble in water, it will be swollen by the boiling water, separate from the meat, and finally drop off the meat. A cold water spray or rinse may be applied to free the meat product of any residual casing material clinging to it.

When the stuffed product is such that, during preparation thereof for the table, it may be subjected to water and heat, the denitrated dextran casing will usually remain closely fitted to the stuffing if the temperature of the water is maintained below the boiling point, for example if it is maintained at 50° C. to 60° C.

In practicing the invention, known types of apparatus comprising a tube-forming extrusion nozzle or device may be used in forming the casing and in producing the final stuffed product.

The following examples are given to illustrate the invention but, as will be understood, are in no way limitative.

*Example I*

About 30 parts by weight of nitrated B–512 dextran having a molecular weight of 50,000 to 70,000 and an average of about 0.5 nitrate groups per AGU, are dissolved in water to obtain a viscous solution which is extruded through an extrusion head having an orifice from which the viscous solution is extruded downwardly in the form of tubing, into a column of air moving in countercurrent to the direction of travel of the tubing. The apparatus used is similar to that commonly used in the dry spinning of cellulose acetate filaments except that the extrusion nozzle is adapted to form tubing. The air heated to 100° C.–105° C., is introduced at the bottom of the jacket and escapes at the top, so that the tubing, in its passage through the jacket, is continuously exposed to fresh heated air whereby the water is evaporated with hardening of the tubing. The tubing is withdrawn at the bottom of the jacket and continuously passed through a denitrating bath consisting of a 5% alcoholic sodium hydroxide solution, washed free of residual denitrating solution, dried and used as casing for sausage.

*Example II*

A viscous solution of 20 parts by weight nitrated B–523 dextran (containing an average of 1.40 nitrate groups per AGU) in 80 parts of a solvent consisting of 60 parts of alcohol and 20 parts of ether is extruded through a tube-forming nozzle directly into a coagulating and conditioning bath consisting of water, in which the nitrated dextran is coagulated. The temperature of the bath is maintained between 20° C. and 60° C. The apparatus used in making the tubing is similar to that described in the U. S. patent to F. H. Reichel et al. No. 2,176,925, and the tubing leaving the bath is stretched 40% longitudinally and 35% transversely. It is then washed, under the stretching tension, and passed through a 5% alcoholic solution of sodium hydroxide for denitration, after which it is washed, optionally treated with a plasticizing agent, and used as sausage casing, with or without drying.

While the invention has been discussed more in detail in connection with casings comprising, initially, dextran nitrate it will be understood that other dextran derivatives or substitution products may be converted partly or completely to dextran as by treating tubing formed therefrom with a suitable reagent to de-esterify, reduce or decompose the dextran derivative and replace the substitutent group by a hydroxyl group. The conversion or reconstitution of the dextran from the substitution product may be accomplished by suitable chemical changes. For instance, dextran may be reconstituted from dextran xanthate by means of heat or a strong mineral acid. Dextran esters, e. g., the acetate, may be de-esterified, as by saponification with a strong alkali or by use of a reducing agent such as an alkali hydrosulfide, whereby the dextran is reconstituted.

The tubing, after reconstitution of the dextran, e. g., after denitration of dextran nitrate, may be purified and finished in any desired manner, for example, by subjecting it to appropriate baths for washing, bleaching, dyeing, plasticizing, preserving, etc., and the purified tubing may then be dried in any suitable manner.

The reconstituted dextran tubing is particularly intended for use as sausage casing, "sausage" being employed in the broad sense and having the generic connotations ascribed to it in the industry. The tubing may also be used for other purposes such as for packaging other kinds of foods including meat products of a type other than sausage, ice cream, food pastes, greases, industrial paste, toothpaste, etc., candles, bottles and other solid articles, and, in the form of short pieces, as bottle closure bands.

Instead of forming the tubing wholly from a dextran derivative, the latter may be mixed with up to 50% by weight of a cellulose derivative which is the same as the dextran derivative, that is, contains the same substituent groups. For instance, dextran nitrate and cellulose nitrate may be mixed in a common solvent, as for instance a mixture of alcohol and ether to obtain a homogeneous mass, extruded through the tube forming device into a liquid which coagulates and hardens the mixture to obtain a tubing in which the dextran and cellulose nitrates are intimately commingled, processed, including stretched if desired, and denitrated to obtain a dextran-cellulose hydrate tubing having modified properties. Alternatively, dextran or the selected substituted dextran may be mixed with other hydrolabile film-formers such as suitably hydrolyzed polyvinyl acetate and other polyvinyl esters; polyvinyl methyl ethers and other polyvinyl ethers; certain types of methyl cellulose, ethyl cellulose, carboxymethyl cellulose and other acid derivatives of cellulose, vinyl and acrylic polymers such as oxidized cellulose, alginic acid, pectic cellulose acid succinate, cellulose acetate acid phthalate, the acid succinates of hydrolyzed polyvinyl acetate, polyacrylic acid, etc., the sodium or other water-soluble salts of these acidic polymeric substances, polymers and copolymers of amino acids and amides such as the nylon types known as FF8, FM8001 and FM6501, natural proteins like gelatin and agar agar, and other similar natural or synthetic film-formers.

A particularly effective mixture is one comprising water-soluble nitrated dextran and hydrolyzed water-soluble polyvinyl alcohol in amounts from 5 to 50% of each, and mixtures of water-soluble nitrated dextran and water-soluble carboxymethyl cellulose, and other similar mixtures in which the diluent film-former is not seriously damaged, e. g., depolymerized by the denitration treatment for the dextran nitrate.

Mixtures of dextran itself, whether water-soluble or water-dispersible, with the aforementioned or other compatible film-formers are also contemplated and may be preferred. The casings are formed from the mixtures in the same manner as described in Example II above, except that aqueous solutions or dispersions of the mixtures may be extruded into the coagulating bath, the water thus added to the bath being removed during circulation thereof. Or solutions of the mixtures in solvents other than water may be extruded.

Illustratively, 15 parts of the nitrated dextran of Example II may be replaced by 15 parts of nitrocellulose having a nitrogen content of about 12%, and the mixture formed into a tubing as described.

The use of the diluent film-former, while optional, is nonetheless desirable and preferred in many instances, since the diluent usually reinforces the strength of the final dextran film.

It will be apparent that changes and modifications may be made in practicing the invention without departing from its scope. Therefore, it is to be understood that the foregoing discussion of the invention is to be interpreted as illustrative and that the invention is not to be limited except as defined in the appended claims.

What is claimed is:

1. A casing for sausage consisting of a tubing comprising water-dispersible, including water-soluble dextran having a molecular weight between 20,000 and that of native, unhydrolyzed dextran as produced from sucrose by dextran-synthesizing strains of Leuconostoc.

2. A casing for sausage consisting of a tubing consisting essentially of reconstituted water-dispersible, including water-soluble dextran having a molecular weight between 20,000 and that of native, unhydrolyzed dextran as produced from sucrose by dextran-synthesizing strains of Leuconostoc.

3. A casing for sausage consisting essentially of denitrated dextran nitrate derived from water-dispersible, including water-soluble dextran having a molecular weight between about 20,000 and that of native, unhydrolyzed dextran as produced from sucrose by dextran-synthesizing strains of Leuconostoc.

4. A casing for sausage consisting of a tubing comprising a substantially homogeneous mixture of water-dispersible, including water-soluble dextran having a molecular weight between about 20,000 and that of native, unhydrolyzed dextran as produced from sucrose by dextran-synthesizing strains of Leuconostoc and another compatible film-forming material.

5. A casing for sausage consisting of a tubing comprising a substantially homogeneous mixture of water-soluble dextran having a molecular weight between about 20,000 and that of native, unhydrolyzed dextran as produced from sucrose by dextran-synthesizing strains of Leuconostoc and another compatible water-soluble film-forming material.

6. A casing for sausage consisting of a tubing comprising an intimate mixture of denitrated dextran nitrate derived from water-dispersible, including water-soluble dextran having a molecular weight between about 20,000 and that of native, unhydrolyzed dextran as produced from sucrose by dextran-synthesizing strains of Leuconostoc and denitrated cellulose nitrate.

7. A casing for sausage consisting of a tubing comprising an intimate mixture of water-dispersible, including water-soluble dextran having a molecular weight between about 20,000 and that of native, unhydrolyzed dextran as produced from sucrose by dextran-synthesizing strains of Leuconostoc and a water-soluble hydrolyzed polyvinyl acetate.

8. A casing for sausage consisting of a tubing comprising an intimate mixture of denitrated dextran nitrate derived from water-dispersible, including water-soluble dextran having a molecular weight between about 20,000 and that of native, unhydrolyzed dextran as produced by dextran-synthesizing strains of Leuconostoc and a water-soluble hydrolyzed polyvinyl acetate.

9. A casing for sausage consisting of a tubing comprising an intimate mixture of denitrated dextran nitrate derived from water-dispersible, including water-soluble dextran having a molecular weight between 20,000 and that of native, unhydrolyzed dextran as produced by dextran-synthesizing strains of Leuconostoc and a water-soluble cellulose derivative.

10. A casing for sausage consisting of a tubing comprising an intimate mixture of denitrated dextran nitrate derived from water-dispersible, including water-soluble dextran having a molecular weight between about 20,000 and that of native, unhydrolyzed dextran as produced by dextran-synthesizing strains of Leuconostoc and water-soluble carboxymethyl cellulose.

11. A casing for sausage consisting of tubing comprising an intimate mixture of denitrated dextran nitrate derived from water-dispersible, including water-soluble dextran having a molecular weight between about 20,000 and that of native, unhydrolyzed dextran as produced by dextran-synthesizing strains of Leuconostoc and a water-soluble alginate.

12. A casing for foodstuffs consisting of a longitudinally and transversely stretched tubing comprising water-dispersible, including water-soluble dextran having a molecular weight between about 20,000 and that of native, unhydrolyzed dextran as produced by dextran-synthesizing strains of Leuconostoc.

13. A casing for foodstuffs consisting of a longitudinally and transversely stretched tubing comprising denitrated dextran nitrate derived from water-dispersible, including water-soluble dextran having a molecular weight between about 20,000 and that of native, unhydrolyzed dextran as produced from sucrose by dextran-synthesizing strains of Leuconostoc.

14. A casing for sausage consisting of a longitudinally and transversely stretched tubing comprising a homogeneous mixture of denitrated dextran nitrate derived from water-dispersible, including water-soluble dextran having a molecular weight between about 20,000 and that of native, unhydrolyzed dextran as produced from sucrose by dextran-synthesizing strains of Leuconostoc and another compatible water-soluble film-forming material.

15. A casing for sausage consisting of a longitudinally and transversely stretched tubing comprising a homogeneous mixture of denitrated dextran nitrate derived from water-dispersible, including water-soluble dextran having a molecular weight between about 20,000 and that of native, unhydrolyzed dextran as produced from sucrose by dextran-synthesizing strains of Leuconostoc and denitrated cellulose nitrate.

16. A casing for sausage consisting essentially of a tubing of water-dispersible, including water-soluble, dextran having a molecular weight of from 50,000 to 70,000.

17. A method of producing skinless frankfurters which comprises providing a casing comprising water-soluble native dextran, stuffing the casing with a sausage mix, smoking and, optionally, cooking the encased stuffing, and subsequently removing the casing from the stuffing by treating the product with water for a time and at a temperature such that the casing is dispersed in the water.

18. A process of producing reconstituted dextran in the form of a seamless tubing adapted to be used as casing for foodstuffs, which comprises extruding a solution containing a coagulable derivative of water-dispersible, including water-soluble dextran having a molecular weight between about 20,000 and that of native, unhydrolyzed dextran as produced from sucrose by dextran-synthesizing strains of Leuconostoc, which derivative is reconstitutable to the dextran into a coagulating medium to form a tubing by coagulation of the dextran derivative, withdrawing the tubing from the coagulating medium, and treating the tubing to reconstitute the dextran from the derivative thereof.

19. A process of producing reconstituted dextran in the form of a seamless tubing adapted to be used as casing for foodstuffs which comprises extruding a solution containing a coagulable dextran nitrate derived from water-dispersible, including water-soluble dextran having a molecular weight between about 20,000 and that of native, unhydrolyzed dextran as produced from sucrose by dextran-synthesizing strains of Leuconostoc into a coagulating medium to form a tubing by coagulation of the nitrate, stretching the tubing longitudinally and transversely, and then treating the stretched tubing with a denitrating medium to reconstitute the dextran from the nitrate.

20. A process in accordance with claim 19, characterized in that the solution extruded contains a mixture of dextran nitrate and another film-forming material compatible with the dextran nitrate.

21. A process in accordance with claim 19, characterized in that the solution extruded contains a mixture of dextran nitrate and a coagulable cellulose nitrate.

References Cited in the file of this patent

UNITED STATES PATENTS

| | | |
|---|---|---|
| 2,070,247 | Weingand et al. | Feb. 9, 1937 |
| 2,172,426 | Weingand et al. | Sept. 12, 1939 |
| 2,627,466 | Lewis | Feb. 3, 1953 |
| 2,674,517 | Deniston | Apr. 6, 1954 |